United States Patent
Shahar et al.

(10) Patent No.: US 10,324,202 B1
(45) Date of Patent: Jun. 18, 2019

(54) SYSTEMS AND METHODS FOR COLLECTING RADIATION DETECTION

(71) Applicant: General Electric Company, Schenectady, NY (US)

(72) Inventors: Arie Shahar, Moshav Magshimim (IL); Jean-Paul Bouhnik, Zichron Yaacov (IL); Moshe Cohen-Erner, Rehovot (IL)

(73) Assignee: General Electric Company, Schenectady, NY (US)

( * ) Notice: Subject to any disclaimer, the term of this patent is extended or adjusted under 35 U.S.C. 154(b) by 4 days.

(21) Appl. No.: 15/860,325

(22) Filed: Jan. 2, 2018

(51) Int. Cl.
*G01T 1/24* (2006.01)

(52) U.S. Cl.
CPC .............. *G01T 1/247* (2013.01); *G01T 1/241* (2013.01)

(58) Field of Classification Search
CPC ................................ G01T 1/247; G01T 1/241
USPC .................. 250/370.09, 370.01, 371, 370.06
See application file for complete search history.

(56) References Cited

U.S. PATENT DOCUMENTS

| | | | | |
|---|---|---|---|---|
| 6,002,741 A * | 12/1999 | Eisen | ...................... | G01T 1/247 250/370.01 |
| 8,269,180 B2 * | 9/2012 | De Geronimo | ......... | G01T 1/247 250/370.01 |
| 9,482,764 B1 * | 11/2016 | Shahan | .................... | G01T 7/005 |
| 2007/0290142 A1 * | 12/2007 | Du | ......................... | G01T 1/241 250/370.09 |
| 2008/0230709 A1 * | 9/2008 | Tkaczyk | .................. | G01T 1/249 250/370.09 |
| 2009/0080601 A1 * | 3/2009 | Tkaczyk | .................. | G01T 1/249 378/19 |
| 2011/0155918 A1 * | 6/2011 | Bouhnik | .................. | G01T 1/249 250/370.14 |
| 2011/0204245 A1 * | 8/2011 | Robert | ................... | G01T 1/1647 250/370.08 |
| 2011/0210235 A1 * | 9/2011 | Dierickx | ................... | G01T 1/17 250/214 R |

(Continued)

OTHER PUBLICATIONS

Iwanczyk et al., "Photon Counting Energy Dispersive Detector Arrays for X-ray Imaging" IEEE Trans Nucl Sci. 2009 ; 56(3): 535-542. doi:10.1109/TNS.2009.2013709. (27 pages).

*Primary Examiner* — David P Porta
*Assistant Examiner* — Blake C Riddick
(74) *Attorney, Agent, or Firm* — Dean D. Small; The Small Patent Law Group, LLC

(57) ABSTRACT

The systems and methods receive signals from pixelated anodes for at least one event, and pass the signals from the pixelated anodes through corresponding channel pairs, attenuate the signal from a plurality of select anodes at the first and second shaper circuits coupled to the plurality of the select anodes to form a candidate energy signals and an authentication energy signals, respectively, compare a ratio to identify whether the select anode is a collected energy signal or a non-collected energy signal, repeat the attenuating and comparing operations for a plurality of select anodes have one or more collecting anode and a plurality of peripheral anodes, subdivide the collecting anode having the collected energy signal into a plurality of sub-pixels, and identify a location of the at least one event relative to the plurality of sub-pixels based on non-collected energy signals from the plurality of peripheral anodes.

20 Claims, 8 Drawing Sheets

(56) References Cited

U.S. PATENT DOCUMENTS

| | | | |
|---|---|---|---|
| 2015/0131776 A1* | 5/2015 | Cho | G01N 23/02 378/19 |
| 2015/0192681 A1* | 7/2015 | Cho | G01T 1/161 250/366 |
| 2016/0245934 A1* | 8/2016 | Shahan | G01T 7/005 |
| 2017/0269240 A1 | 9/2017 | Shahar et al. | |

* cited by examiner

SYSTEMS AND METHODS FOR COLLECTING RADIATION DETECTION

BACKGROUND OF THE INVENTION

The subject matter disclosed herein relates generally to imaging systems, and more particularly to methods and systems for enhancing non-collected energy signals, which provides a location of an event and reduce a need for a low noise hardware circuitry.

Conventional radiation detectors receive one or more photons during an imaging session representing at least one event. A collected energy signal represents a signal created by a collecting anode in response to absorption of a photon at the voxel under the collecting anode, which represents an event collected by the radiation detector. Non-collected energy signals represent signals created by adjacent anodes that are above voxels that do not absorb the photon but are adjacent to the voxel that absorbs the photon, which is under the collecting anode. The non-collected energy signals are used to identify a position of the photon and/or event within the absorbing voxel or pixel to which may also be referred to hereby as collecting anode. Similarly, the non-absorbing voxels or pixels may also be referred to hereby as non-collecting anodes. A shaper circuit is a band-pass filter designed to improve the Signal-to-Noise Ratio (SNR) of the collecting and non-collecting signals and is utilized to conform the non-collected energy signals to a standard shape. The shaper circuit may have a peaking time (integration time) of 250 nanoseconds.

However, the non-collected energy signals are significantly smaller and/or weaker relative to the collected energy signal. The non-collected energy signals are conventionally narrow pulses that have a 30-60 nanosecond rise time and a duration time of about 50-100 ns. Also, the frequencies of the non-collected energy signals are higher relative to the collected energy signal. Based on the peaking time of the shaper circuit, which is selected for optimal SNR of the collected signal and may be 250 ns, the narrow (50-100 ns) transient non-collected energy signals are suppressed by the relatively long peaking time of the shaper circuit. Additionally, to acquire the non-collected energy signals, a low noise application specific integrated circuit is needed. For example, the low noise is needed because the signal to noise ratio of the non-collected energy signals are very poor, which may result in error. Additionally, the non-collected energy signals are utilized to determine a location of the event within the collecting anode. However, due to the suppression by the shaper circuit of the non-collected energy signals, the location of the event is difficult to calculate.

BRIEF DESCRIPTION OF THE INVENTION

In an embodiment, a method (e.g., for identifying a collected energy signal and/or a non-collected energy signal and a location of the event) is provided. The method includes receiving signals from pixelated anodes of a radiation pixelated detector during at least one event, passing the signals from the pixelated anodes through corresponding channel pairs, each of the channel pairs including first and second shaper circuits, and attenuating the signal from a select anode at the first and second shaper circuits coupled to the select anode to form a candidate energy signal and an authentication energy signal, respectively. The method further includes comparing a ratio of the candidate and authentication energy signals to identify whether the candidate energy signal from the select anode is a collected energy signal or a non-collected energy signal. The method includes repeating the attenuating and comparing operations for a plurality of select anodes to have one or more collecting anode and a plurality of peripheral anodes. The method includes subdividing the select anode, having the collected energy signal, into a plurality of sub-pixels, and identifying a location of the at least one event relative to the plurality of sub-pixels based on a plurality of the non-collected energy signals from the plurality of peripheral anodes.

In an embodiment, a system (e.g., a medical imaging system) is provided. The system includes a radiation pixelated detector having a plurality of pixelated anodes operably coupled to corresponding electronic channels. The system includes the electronic channels electrically coupled to the plurality of pixelated anodes having channel pairs. A first channel pair includes a first shaper circuit and a second channel pair includes a second shaper circuit. The system includes at least one processor operably coupled to the electronic channels. The at least one processor is configured to receive signals from pixelated anodes of a radiation pixelated detector during at least one event, and pass the signals from the pixelated anodes through corresponding channel pairs. Each of the channel pairs includes first and second shaper circuits. The at least one processor is configured to attenuate the signal from a select anode at the first and second shaper circuits coupled to the select anode to form a candidate energy signal and an authentication energy signal, respectively. The at least one processor is further configured to compare a ratio of the candidate and authentication energy signals to identify whether the candidate energy signal from the select anode is a collected energy signal or a non-collected energy signal. The at least one processor is further configured to repeat the attenuating and comparing operations for a plurality of select anodes having one or more collecting anode and a plurality of peripheral anodes. The at least one processor is further configured to subdivide the collecting anode having the collected energy signal into a plurality sub-pixels. The at least one processor is further configured to identify a location of the at least one event relative to the plurality of sub-pixels based on a plurality of the non-collected energy signals from the plurality of peripheral anodes.

In an embodiment a tangible and non-transitory computer readable medium comprising one or more programmed instructions configured to direct one or more processors is provided. The one or more processors are directed to receive signals from pixelated anodes of a radiation pixelated detector during at least one event, and pass the signals from the pixelated anodes through corresponding channel pairs. Each of the channel pairs including first and second shaper circuits. The one or more processors are further directed to attenuate the signal from a select anode at the first and second shaper circuits coupled to the select anode to form a candidate energy signal and an authentication energy signal, respectively. The one or more processors are further directed to compare a ratio of the candidate and authentication energy signals to identify whether the candidate energy signal from the select anode is a collected energy signal or a non-collected energy signal, and subdivide the select anode having the collected energy signal into a plurality of sub-pixels. The one or more processors are further directed to repeat the attenuating and comparing operations for a plurality of anodes having one or more collecting anode and a plurality of peripheral anodes. The one or more processors are further directed to subdivide the collecting anode having the collected energy signal into a plurality of sub-pixels, and identify a location of the at least one event relative to the plurality of sub-pixels based on non-collected energy signals from the plurality of peripheral anodes.

DETAILED DESCRIPTION OF THE INVENTION

Figure 1:
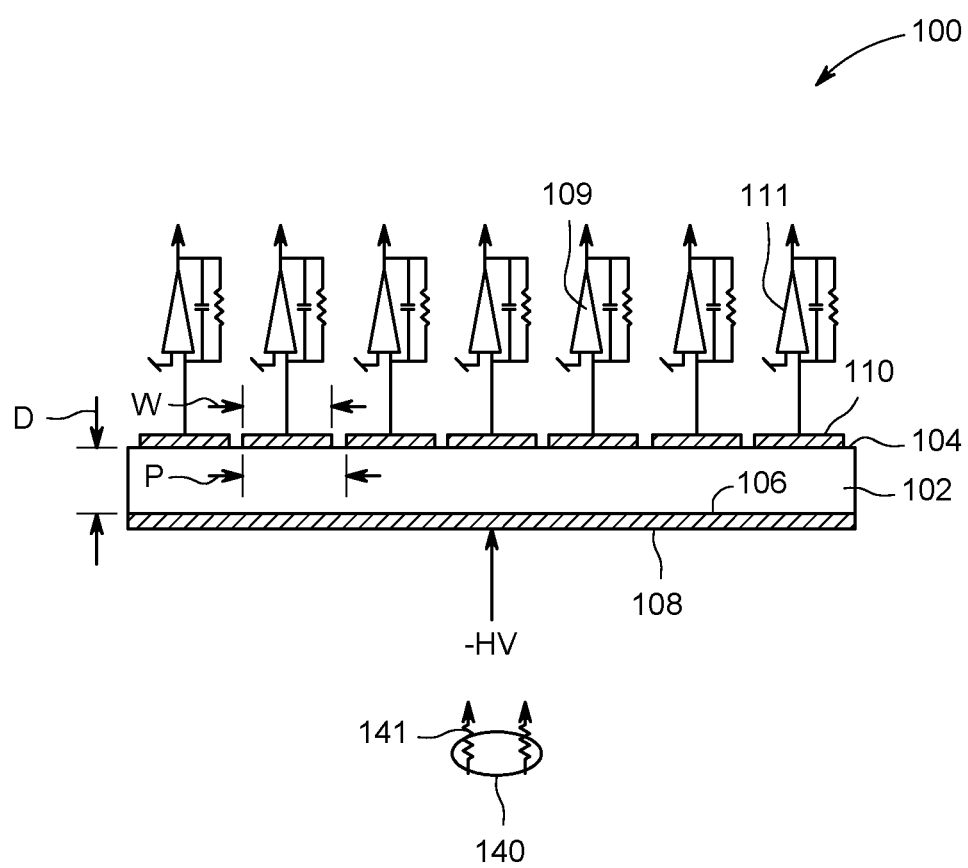
FIG. 1 is a side view of an embodiment of a portion of a radiation pixelated detector.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Overview

Generally, various embodiments provided herein describe radiation pixelated detectors for ionizing radiation, such as X-Ray and Gamma-Rays, and more specifically for radiation detectors of a medical imaging system such as a nuclear imaging system, a gamma camera, Single Photon Emission Computed Tomography (SPECT), Molecular Brest Imaging (MBI), Positron Emission Tomography (PET), and/or the like. The radiation pixelated detectors include an array, a matrix, and/or the like of pixelated anodes. The pixelated anodes are electrically coupled to electronic channels having dual channel pairs. The dual channel pairs are configured to identify whether the signal received from the anode represents a non-collected energy signal and/or a collected energy signal. The dual channel pairs include a first channel pair having a first shaper circuit and a second channel pair having a second shaper circuit. The first shaper circuit is configured to provide a high signal-to-noise ratio for the collected energy signal. Alternatively, the second shaper circuit is configured to provide a high signal-to-noise ratio for the non-collected energy signal.

The identification of the signal as the collected and/or non-collected energy signal is based on the output voltage signals from the first and second channel pairs. The systems and/or methods identify the type of signal based on a ratio of the output voltage signals. For example, the ratio is compared with a threshold. Responsive to the relationship of the ratio with the threshold, the signal is determined to be either the collected energy signal and/or the non-collected energy signal.

A technical effect provided by at least one embodiment includes providing a stronger and/or enhanced non-collected energy signal. A technical effect provided by at least one embodiment includes providing a non-collected energy signal having a greater signal-to-noise relative to conventional pixelated radiation detectors. A technical effect provided by at least one embodiment includes providing an accurate location derivation of the event within the collecting anode. A technical effect provided by at least one embodiment includes pixelated radiation detectors that include an application specific integrated circuit that is not necessary with low noise.

Terms

The term "shaper circuit" refers to a circuit that integrates and differentiates the signal received from a corresponding anode based on a signal shaping characteristic of interest (COI) to form a signal having a desired shape. For example, the shaping COI may be a Gaussian shape. The shaper circuit can represent a band-pass filter including integration and differentiation circuitries. The integration and differentiation time-constants of the shaper are selected to improve the signal-to-noise ratio (SNR) of the signal by filtering out the noise in a certain range of spectral frequencies. The filtration process (signal shaping) attenuates the noise but also attenuates the signal. The attenuation of the noise is much stronger than the suppression of the signal, thus resulting in the SNR improvement. The time that an output of the shaper circuit integrates the signal until the output reaches a peak value is known as the peaking time. Non-limiting examples of a shaper circuit may include additional parts and/or circuits of the electronic channels and thus may include an amplifier, a flip-flop, a buffer, an amplitude discriminator, a comparator, and/or the like. The shaping characteristics of interest may include a time between a start of a pulse and a peak of a signal, a rise time, a peak of the signal, a fall time as well as an attenuation profile over the rising, peak and falling segments of the signal. For example, a shaper circuit may utilize triggers, in which an amplitude discriminator analyzes the received signal. The amplitude discriminator triggers one or more timers to define reference points for the shaping characteristics of interest such as triggers for rise time, signal peak, and fall time. Additionally, the triggers may be used to define a collection time of the signal which corresponds to a duration of the signal between the rise and fall times. As one example, the shaper circuit integrates and differentiates the signal to form a Gaussian shape over a shaping time that is greater relative to the collection time. As a further example, the shaper circuit passes an envelope along the signal to integrate and differentiate the signal over the shaping time to form the Gaussian shape.

Different shaping circuits may be defined to include different shaping characteristics of interest. For example, a first shaping circuit, also referred to as a collected energy shaping circuit, has first shaping characteristics of interest that define a first attenuation profile having a first width of a first Gaussian shape, a first time constant, and a first peak at a select reference time after the pulse start time (e.g., 250 nanoseconds after the pulse start time). As another example, a second shaping circuit, also referred to as a non-collected energy shaping circuit, has second shaping characteristics of interest that define a second attenuation profile having a second width of a second Gaussian shape, a second time constant, and a second peak at a select reference time after the pulse start time (e.g., 30-60 nanoseconds after the pulse start time).

The term "collected energy signal" is used to refer to an energy signal that is output by a collecting anode from an array of pixelated anodes. For example, the collecting anode may represent a select anode in connection with one event (e.g. a photon impinges upon and is absorbed by the anode/voxel/pixel), while the same anode may represent a peripheral anode in connection with another event (e.g., a photon impinges upon and is absorbed by an adjacent anode/voxel/pixel).

The term "non-collected energy signal" is used to refer to an energy signal that is output by a peripheral anode that is located adjacent to a collecting anode, where the collecting anode is the anode that absorbs a photon. For example, an anode may represent the peripheral anode in connection with one event (e.g., a photon impinges upon and is absorbed by the collecting anode adjacent to the peripheral anode), while the same anode may represent the peripheral anode in connection with another event (e.g., a photon impinges upon and is absorbed by an alternative collecting anode).

The term "candidate energy signal" is used to refer to an output of a shaping circuit (e.g., an amplifier circuit configured to have signal shaping characteristics of interest) coupled to a select anode. The energy signal is referred to as a "candidate" to indicate that the energy signal has not yet been validated or verified as a collected energy signal. For example, the candidate energy signal has not yet been compared or otherwise analyzed with respect to energy signals from peripheral anodes.

The term "authentication energy signal" is used to refer to an output of a shaping circuit (e.g., an amplifier circuit configured to have signal shaping characteristics of interest) of a select anode. The energy signal is referred to as an "authentication" to indicate that the energy signal is used to validate or verify a collected energy signal from the select anode. The authentication energy signal also represents a non-collected energy signal. For example, the authentication energy signal is compared or otherwise analyzed with respect to energy signals from the select anode.

Pixelated Radiation Detector

Figure 2:
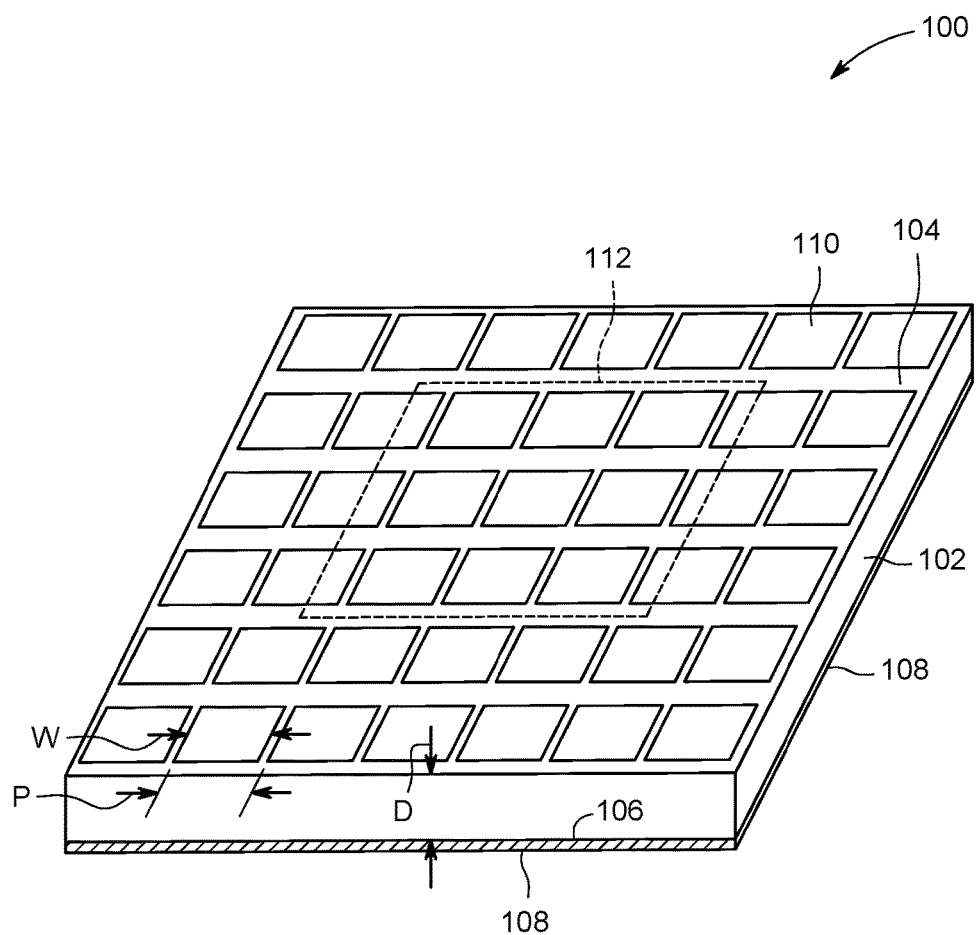
FIG. 2 is a peripheral view of an embodiment of a portion of a radiation pixelated detector.

FIGS. 1 and 2 illustrate portions of a radiation pixelated detector (RPD) 100, in accordance with an embodiment. FIG. 1 illustrates a side view of the RPD 100, and FIG. 2 illustrates a peripheral view of the RPD 100. The RPD 100 includes a semiconductor plate 102. The semiconductor plate 102 may include CZT, CMT, HgI, Si, GaAr, Si, Ge, and/or the like. The semiconductor plate 102 includes first and second surfaces 104 and 106. A monolithic cathode contact 108 is overlaid on the second surface 106 of the semiconductor plate 102. The cathode contact 108 of the RPD 100 is biased by a negative high-voltage (e.g., "−HV"). Pixelated anodes 110, representing a plurality of pixels of the RPD 100, are overlaid on the first surface 104. The pixelated anodes 110 are shown having square shapes with dimensions of "W×W" and a pitch "P." Additionally or alternatively, the pixelated anodes 110 may be a circle, a triangle, a rectangle, and/or the like. The RPD 100 has a thickness "D" based dimensions of the semiconductor plate 102, which is designed to absorb radiation that includes photons (e.g., the photons 141 can be grouped into a plurality of photons 140) having energy within the range of ionizing radiation (e.g., X-Ray and/or Gamma Ray radiation).

An event occurs when a photon 141 interacts with the RPD 100, and the photon 141 is absorbed by the semiconductor 102. The absorbed photon 141 generates a collected energy signal at the pixelated anodes 110 that absorbs the photon 141. Optionally, the pixelated anodes 110 may represent and/or include pixels, voxels, and/or the like of the RPD 100. Additionally, the pixelated anodes 110 adjacent to the collected energy signal (e.g., the collecting anode) generate the non-collected energy signals. The pixelated anodes 110 are each operably coupled to corresponding electronic channels 111. Additionally or alternatively, the electronic channels 111 may be operably coupled to more than one of the pixelated anodes 110.

The electronic channels 111 are configured to process the collected and non-collected energy signals from the pixelated anodes 110 and form an output voltage signal. The electronic channels 111 include charge sensitive preamplifiers (CSP) 109. The CSP 109 are configured to clamp the potential of the pixelated anodes 110 to a voltage that is equal to the voltage of a virtual ground of the CSP 109. For example, the CSP 109 clamps the voltage of the pixelated anodes 110 to a potential at and/or approximate to zero.

Figure 3:
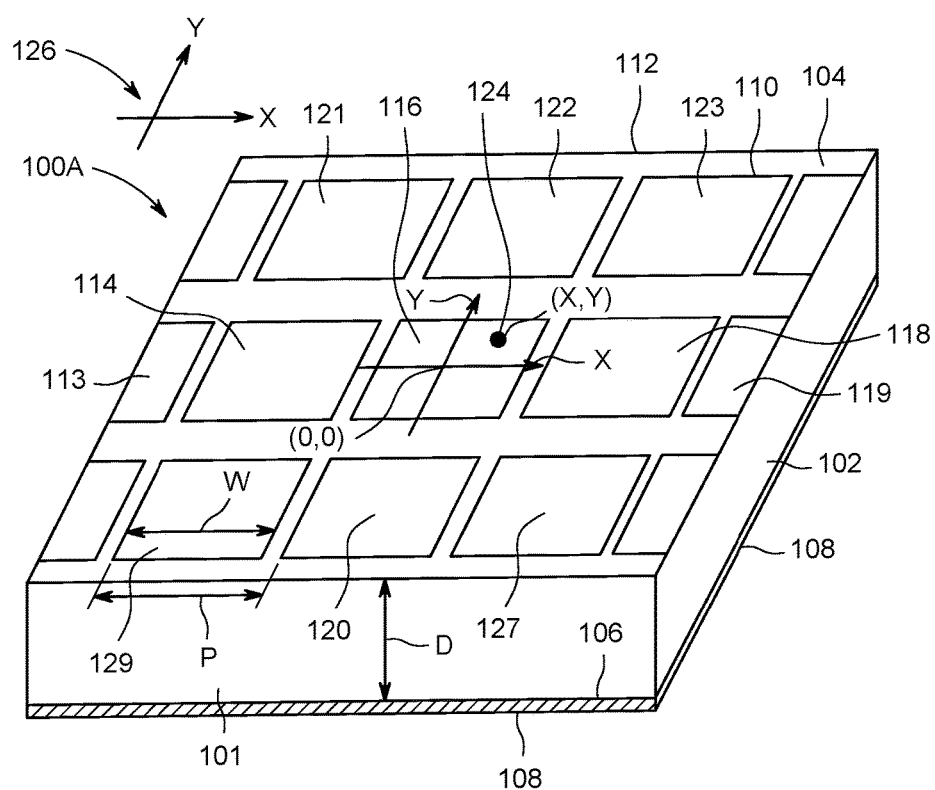
FIG. 3 is an expanded portion of the radiation pixelated detector shown in FIG. 2.

FIG. 3 is an expanded portion 100A of the RPD 100 shown in FIG. 2, in accordance with an embodiment. The expanded portion is represented by a frame 112 shown in FIG. 2. The RPD 100 is shown aligned with an X, Y Cartesian coordinate system 126. The expanded portion 100A includes the pixelated anodes 110 (e.g., the anodes 113, 114, 116, 118, 119, 122, 120). The pixelated anodes 113, 114, 116, 118, and 119 are aligned along an X-coordinate and/or plane of the Cartesian coordinate system 126. The anodes 116, 120, and 122 are aligned along a Y-coordinate and/or plane of an X, Y Cartesian coordinate system 126. The expanded portion 100A include sidewalls 101 of the semiconductor plate 102. The sidewalls 101 have a thickness D between the first and second surfaces 104, 106.

The expanded portion 100A of the RPD 100 includes an event 124 within the collecting anode 116. One of the photons 140 are absorbed by the collecting anode 116 creating the event 124. The peripheral anodes 114, 118 are directly adjacent to the collecting anode 116. For example, the peripheral anodes 114, 118 are on opposing sides of the collecting anode 116 along the X-coordinate. In another example, the peripheral anodes 120, 122 are on opposing sides of the collecting anode 116 along the Y-coordinate. The peripheral anodes 114, 118, 120, 122 generate signals representing the non-collected energy signals, which are received by the electronic channels 111. The event 124 is located at a coordinate of (X, Y) within the collecting anode 116. The coordinates are determined relative to an origin position based on the collecting anode 116, which absorbs the photon 141. For example, the coordinate of the event 124 is based on a position relative to the collecting anode 116. The values along the X and Y-coordinates are measured relative to an origin at a center of the collecting anode 116.

Electronic Channels

Figure 4:
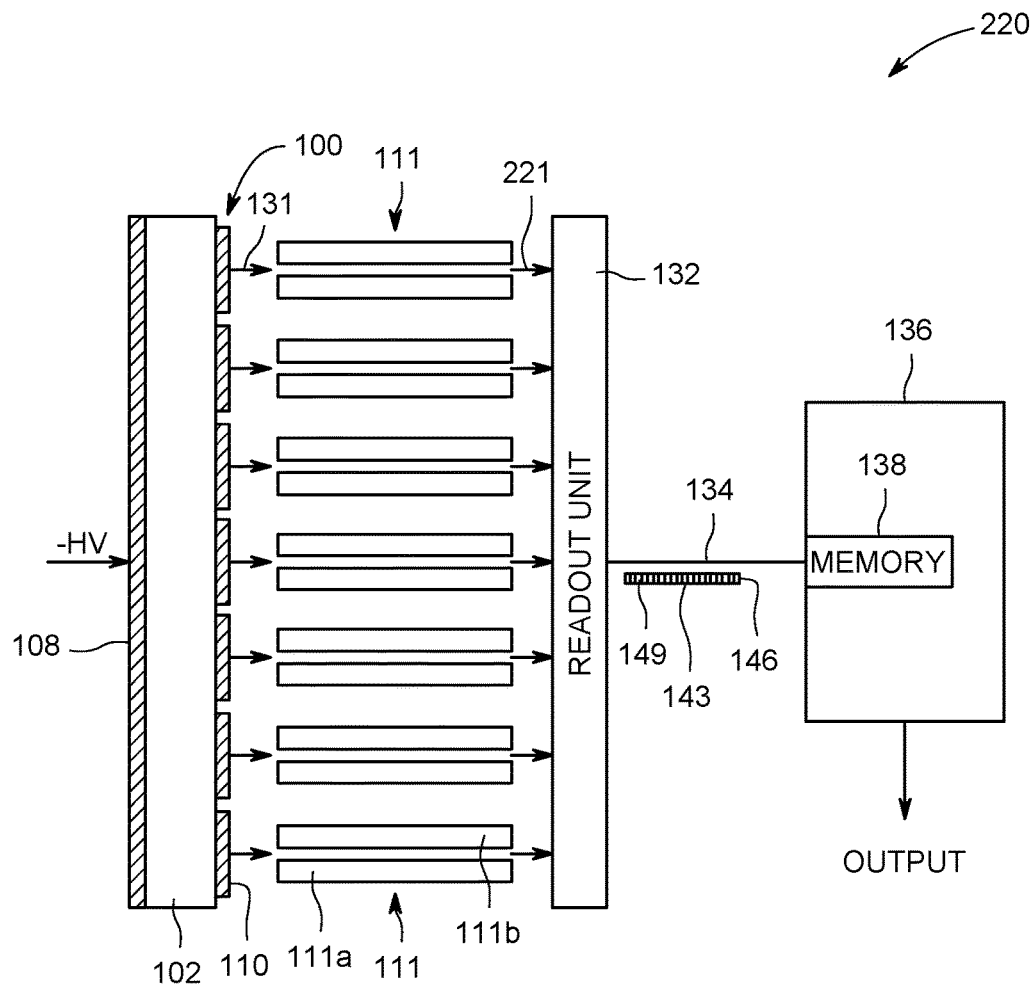
FIG. 4 is a schematic illustration of an embodiment of a radiation pixelated detector having electronic channels operably coupled to a controller circuit.

FIG. 4 is a schematic illustration 220 of an embodiment of the RPD 100 having the electronic channels 111 operably coupled to a controller circuit 136, in accordance with an embodiment. The controller circuit 136 may include at least one processor. Optionally, the controller circuit 136 may include a central processing unit (CPU), one or more microprocessors, an application specific integrated circuit, or any other electronic component capable of processing input data according to specific logical instructions. Optionally, the controller circuit 136 may include and/or represent one or more hardware circuits or circuitry that include, are connected with, or that both include and are connected with one or more processors, controllers, and/or other hardware logic-based devices. Additionally or alternatively, the controller circuit 136 may execute instructions stored on a tangible and non-transitory computer readable medium (e.g., a memory 138).

The electronic channels 111 may include one or more processors. Optionally, the electronic channels 111 may include a central processing unit (CPU), one or more microprocessors, or any other electronic component capable of processing input data according to specific logical instructions. Optionally, the electronic channels 111 may include and/or represent one or more hardware circuits (e.g., analog components, amplifiers, comparators, flip-flops, buffers) or circuitry that include, are connected with, or that both include and are connected with one or more processors, controllers, and/or other hardware logic-based devices. Additionally or alternatively, the electronic channels 111 may execute instructions stored on a tangible and non-transitory computer readable medium.

Figure 5:
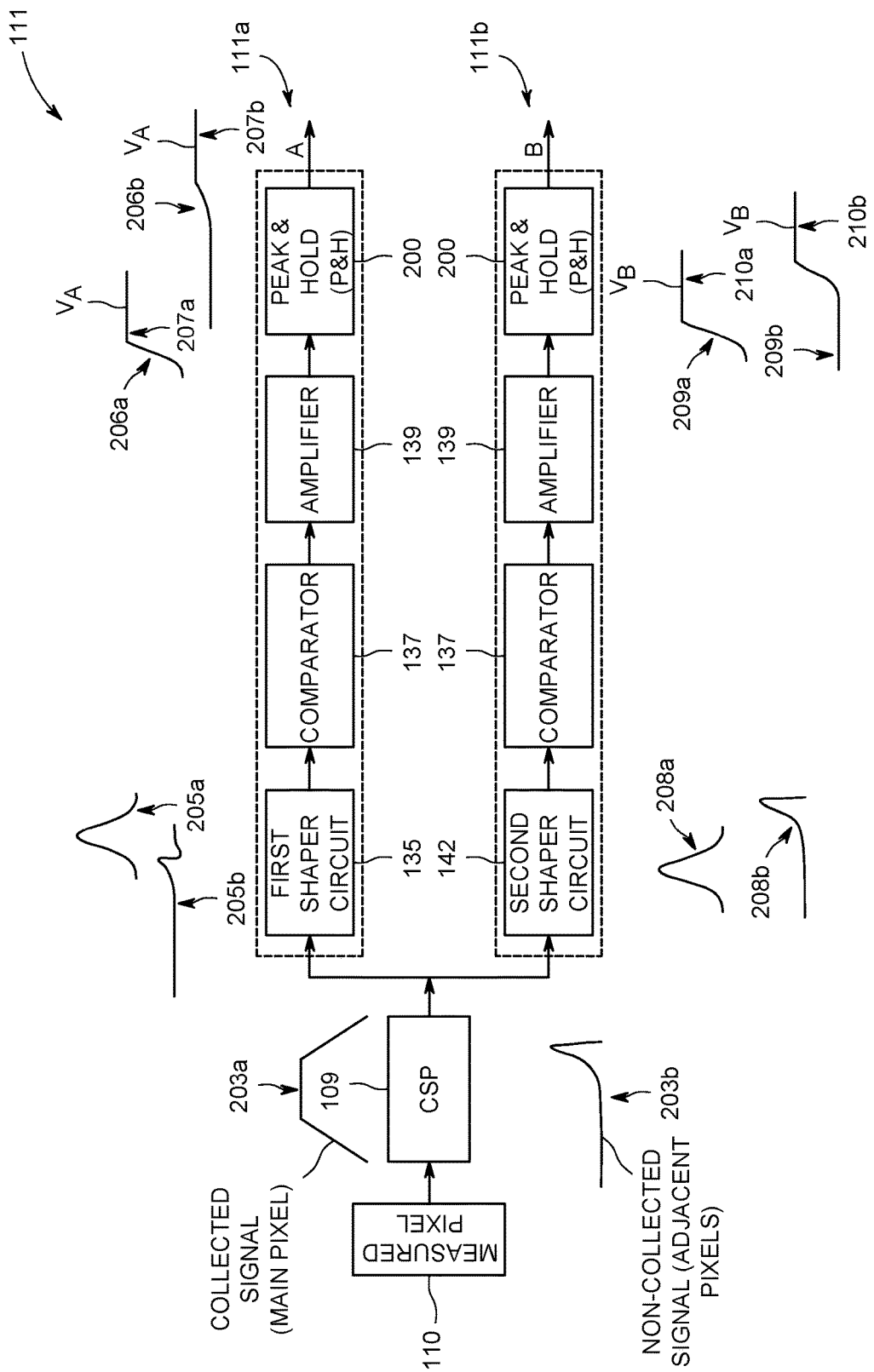
FIG. 5 is a schematic illustration of an embodiment of a portion of the electronic channels shown in FIG. 4.

The pixelated anodes 110 of the RPD 100 are electrically and/or operably coupled to a corresponding one of the electronic channels 111 via interconnections 131. The interconnections 131 are configured to clamp a voltage potential of the pixelated anodes 110 to be equal to a virtual ground (e.g., approximately zero) of the charge sensitive pre-amplifiers (CSP) 109, shown in FIGS. 1 and 5. The electronic channels 111 receive the electrical charge signals measured by the pixelated anodes 110 via the interconnections 131. The electronic channels 111 are shown having different channel pairs, which include first and second shaper circuits 135, 142 as shown in FIG. 5. For example, the electronic channels 111 may include a channel pair that includes first and second channel pairs 111a and 111b. The first channel pair 111a may include a first shaper circuit 135, while the second channel pair 111b may include a second shaper circuit 142.

The electronic channels 111 are electrically and/or operably coupled to a readout unit 132. The readout unit 132 is configured to collect, via outputs 221 of the electronic channels 111, the voltage signals received from the electronic channels 111, and to convert the analog values of the voltage signals into digital values. For example, the readout unit 132 may include analog to digital converters. Optionally, the readout unit 132 may be integrated with the electronic channels 111 and/or the controller circuit 136 (e.g., received along an analog array). The readout unit 132 is configured to generate digital addresses associated with each of the digital values. The digital addresses represent the pixelated anodes 110 that generate a signal (e.g., the collected energy signal, the non-collected energy signal). The readout unit 132 is configured to generate a data packet 146 representative of the output voltage signals from the electronic channels 111. The data packet 146 may include a header 143 containing an address representing a location of the pixelated anodes 110 on the RPD 100. The data packet 146 includes a payload 149. The payload 149 includes the digital values generated by the readout unit 132 representative of the voltage signal produced by the pixelated anodes 110. The data packets 146 are transmitted from the readout unit 132 via a port 134 to the controller circuit 136 and stored in the memory 138.

The data packets 146 in the memory 138 are analyzed by the controller circuit 136. For example, the controller circuit 136 is configured to execute one or more algorithms stored in the memory 138 to determine whether the signal of the pixelated anodes 110 corresponds to the collected energy signal and/or the non-collected energy signal.

FIG. 5 is a schematic illustration of an embodiment of a portion of the electronic channels 111, shown in FIG. 4. The electronic channels 111 are shown having dual channel pairs 111a-b, which are operably coupled to each of the pixelated anodes 110. The channel pairs 111a-b are operably coupled to the CSP 109, and represent different operations of the electronic channels 111. The channel pairs 111a-b are configured to include different shaper circuits 135 and 142 having different peaking/shaping times, respectively and thus attenuate the signals concurrently and/or simultaneously received from the pixelated anodes 110 based on the different peaking/shaping times which produce different attenuation profiles.

A first channel pair 111a of the electric channels 111 include a first shaper circuit (e.g., a collected energy shaper circuit) 135, a comparator circuit 137, an amplifier circuit 139, and a peak and hold (P&H) circuit 200, which process the signals received from the interconnections 131. The second channel pair 111b of the electric channels 111 include a second shaper circuit (e.g., a non-collected energy shaper circuit) 142, the comparator circuit 137, the amplifier circuit 139, and the P&H circuit 200, which process the signals received from the interconnections 131. The operations of the first and second channel pairs 111a-b may correspond to operations performed by one or more processors by the electronic channels 111 and/or by configured hardware (e.g., ADC converters, amplifiers, filters).

The CSP 109 is configured to integrate the electrical charge signals generated by the pixelated anodes 110. The CSP 109 is configured to clamp the potential of the pixelated anodes 110 to a voltage that is equal to the voltage of a virtual ground of the CSP 109. The CSP 109 generates integrated signals 203a-b that are representative of an integrated collecting and/or non-collected energy signals. The collected and/or non-collected energy signals are integrated over time by the CSP 109 to define the integrated signals 203a-b. For example, the integrated signal 203a represents a voltage potential of the collected energy signal over time. Over time, the integrated signal 203a reaches a steady state value such as a voltage potential. The steady state value of the integrated signal 203a may be discharged to allow the processing of the next event in the pixelated anodes 110. The discharge time for the integrated signal 203a is based on the event rate of the collecting anode 110. The steady state value represents the total induced charge collected by the pixelated anodes 110. The voltage potential of the pixelated anodes 110, for example, is determined by the CSP 109, which is configured to clamp the voltage potential of the pixelated anodes 110 to a voltage that is equal and/or similar to the voltage of the virtual ground of the CSP 109.

In another example, the integrated signal 203b represents the non-collected energy signal. The non-collected energy signal represents a voltage potential of peripheral pixelated anodes 110 are directly adjacent to the collecting anode 116 that includes the event 124. The photon absorbed by the collecting anode 116, generates a voltage potential to peripheral anodes 114, 118, 120, 122 that represent the non-collected energy signal. Alternatively, the non-collected energy signals do not reach a steady state value as the collected energy signal. For example, the non-collected energy signal has a narrow pulse and high frequency relative to the collected energy signal. The narrow pulse and high frequency is based on the lack of a photon being absorbed by the peripheral anodes 114, 118, 120, 122. The narrow pulse typically has a rise time between 30-60 nanoseconds. In connection with FIG. 5, the integrated signal 203b is shown not having a steady state value relative to the integrated signal 203a, but rather a peak.

The integrated signals 203a-b are passed, concurrently and/or simultaneously, to corresponding first channel pairs 111a at the first shaper circuit 135. The first shaper circuit 135 is configured to filter the integrated signals 203a-b. For example, the first shaper circuit 135 integrates the integrated signals 203a-b to form filtered signals 205a-b, respectively. The first shaper circuit 135 of the corresponding first channel pairs 111a attenuate the integrated signals 203a-b to conform to attenuation profiles. For example, the first shaper circuit 135, arranged to improve the signal-to-noise ratio (SNR) of the integrated collected signal 203a, includes the attenuation profiles to have a peak (e.g., amplitude) at 250 nanoseconds. The peak of the first shaper circuit 135 is configured to correspond to a peak of a target of the collected energy signal. For example, the filtered signal 205a is based on the integrated signal 203a representing the collected energy signal. The filtered signal 205a is shown having a peak representing a Gaussian shape. The first shaper circuit 135 amplifies the collected energy signal based on a time constant of the attenuation profile, which improves the signal-to-noise ratio for the collected energy signal.

Alternatively, the filtered signal 205b representing the non-collected energy signal is suppressed by the first shaper circuit 135. For example, the non-collected energy signal includes the narrow pulse and the high frequency. Based on the electrical characteristics of the non-collected energy signal, the first shaper circuit 135 filters the non-collected energy signal to reach a peak at 250 nanoseconds. Responsive to the attenuation by the first shaper circuit 135, the filtered signal 205b is suppressed based on the mismatch of peaks. For example, the non-collected energy signal of the integrated signal 203b has a peak between 30-60 nanoseconds. The first shaper circuit 135 attenuates the integrated signal 203b to reach the peak at 250 nanoseconds. The first shaper circuit 135 shifts the integrated signal 203b to conform to the peak at 250 nanoseconds, which forms the filtered signal 205b. The attenuation by the first shaper circuit 135 to match the peak at 250 nanoseconds reduces the amplitude and deforms the integrated signal 203b. For example, the filtered signal 205b does not have a Gaussian shape relative to the filtered signal 205a. The first shaper circuit 135 is configured to have an integration time-constant that is too long (e.g., slow) to follow the peak of the integration signal 203b in a period that is equal to the peak time of the integration signal 203b. For example, the filtered signal 205b follows the integration signal 203b on its way down while the filtered signal 205b is far from reaching the peak value of the integration signal 203b, resulting in a strong attenuation of the integration signal 203b to form the filtered signal 205b.

The integrated signals 203a-b are passed to the second shaper circuit 142 of the corresponding second channel pairs 111b. The second shaper circuit 142 is configured to filter the integrated signals 203a-b based on the attenuation profiles. For example, the second shaper circuit 142 attenuates the integrated signals 203a-b to form filtered signals 208a-b. The second shaper circuit 142 attenuates the integrated signals 203a-b to conform to the attenuation profiles. For example, the second shaper circuit 142 includes attenuation profiles to have a peak (e.g., amplitude) between 30-60 nanoseconds, which corresponds to the electrical characteristics of the non-collected energy signal. The second shaper circuit 142 is configured to amplify the non-collected energy signal to improve the signal-to-noise ratio. For example, the filtered signal 208b from the non-collected energy signal is not suppressed as shown with the first shaper circuit 135 relative to the filtered signal 205b. The filtered signal 208b is shown having a peak and/or a Gaussian shape, which is different relative to the filtered signal 205b.

The filtered signals 205a-b, 208a-b are passed to the comparator circuit 137. The comparator circuit 137 is configured to compare the amplitudes of the filtered signals 205a-b, 208a-b to a predetermined non-zero threshold, or to block the amplitude when the amplitude is below the predetermined non-zero threshold. An amplitude of an output of the comparator circuit 137 may be equal to or larger than the amplitude of the filtered signals 205a-b, 208a-b, which depends on the amplification of the comparator circuit 137.

The amplifier circuit 139 is configured to amplify the output of the comparator circuit 137 by further increasing the amplitude. For example, the amplifier circuit 139 increases the amplitude of the output of the comparator circuit 137 to form an amplified signal.

The output of the amplifier circuit 139 is passed to the P&H circuit 200. The P&H circuit 200 is configured to amplify the signal to hold a maximum value corresponding to and/or about amplitudes 207a-b, 210a-b of output voltage signals 206a-b, 209a-b. The output voltage signals 206a-b, 209a-b include a rising portion and peak values and/or amplitudes 207a-b, 210a-b, respectively. The output voltage signals 206a-b, 209a-b are received by the readout unit 132. For example, the output voltage signals 206a, 209a represent the candidate energy signals collected energy signal, and the output voltage signals 206b, 209b represent the authentication energy signals. It may be noted that the amplitudes 207a-b of the output voltage signals 206a-b, respectively, are based on the shaper circuit 135 of the first channel pair 111a. For example, the amplitude 207b of the voltage signal 206b is smaller relative to the amplitude 207a responsive to the attenuation of the first shaper circuit 135. In another example, responsive to the second shaper circuit 142 outputting the filtered signal 208b, the voltage signal 209b includes the amplitude 210b, which is greater relative to the amplitude 207b. Relations between the amplitudes 207a-b and 210a-b of the output voltage signals 206a-b and 209a-b, respectively, such that the amplitude 207a is greater than the amplitude 207b. Additionally or alternatively, the amplitudes 207a, 210a and 210b are shown having proximate amplitudes, but with different SNRs.

The payload 149 of the data packet 146 includes digital values of the amplitudes 207a-b, 210a-b of the output voltage signals 206a-b, 209a-b, which are stored in the memory 138. Optionally, the payload 149 may include the amplitudes of the outputs of the CSP 109, the first shaper circuit 135, the second shaper circuit 142, the comparator circuit 137, the amplifier circuit 139, and/or the P&H circuit 200. The amplitudes 207*a-b*, 210*a-b* of the output voltage signals 206*a-b*, 209*a-b* are representations of the electrical charges of the pixelated anodes 110 of the RPD 100.

Determination of Collected Energy Signal and/or Non-Collected Energy Signal

The controller circuit 136 is configured to form a ratio based on the output voltage signals 206*a-b*, 209*a-b* from the first and second channel pairs 111*a-b* for each of the triggered pixelated anodes 110 that passed a certain threshold of the comparator circuit 137. The ratio is defined as shown in Equation 1. For example, the controller circuit 136 defines the ratio based on the output voltage signals 206*a-b* of the first channel pair 111*a* (e.g., the voltage Va) over the output voltage signals 209*a-b* of the second channel pair 111*b* (e.g., the voltage Vb). The voltage (e.g., Va, Vb) of the output voltage signals 206*a-b*, 209*a-b* may represent the amplitudes 207*a-b*, 210*a-b*.

$$Va/Vb \quad \text{Equation (1)}$$

The controller circuit 136 compares the ratio with a threshold, such as 0.5, which is stored in the memory 138. Based on the ratio, the controller circuit 136 identifies which of the signals received from the pixelated anodes 110 correspond to the collected energy signals and/or the non-collected energy signals.

In connection with FIG. 3, the collecting anode 116 absorbs the photon corresponding to the event 124. The controller circuit 136 determines a ratio for the signal from the output voltage signals 206*a-b*, 209*a-b* of the electronic channels 111.

For example, the output voltage signals 206*a* for the first channel pair 111*a* includes the amplitude 207*a* of 0.85 V, and the voltage output signal 209*a* for the second channel pair 111*b* includes the amplitude 210*a* of 0.2 V. The controller circuit 136 determines the ratio is 4.25. The controller circuit 136 compares the ratio of 4.25 to the threshold stored in the memory 138. For example, the threshold is 0.5. Responsive to the ratio 4.25 being above 0.5, the controller circuit 136 determines the signal received from the collecting anode 116 is the collected energy signal. The controller circuit 136 selects the amplitude 207*a* from the voltage signal 206*a* (e.g., the candidate energy signal) as the collected energy signal from the first channel pair 111*a*.

In another example, the output voltage signal 206*b* for the first channel pair 111*a* includes the amplitude 207*b* of 0.5 V, and the output voltage signal 209*b* for the second channel pair 111*b* includes the amplitude 210*b* of 1.5 V. Responsive to the ratio 0.33 being below 0.5, the controller circuit 136 determines the signal received from the peripheral anode 114 is the non-collected energy signal. The controller circuit 136 selects the amplitude 210*b* from the output voltage signal 209*b* (e.g., the authentication energy signal) as the non-collected energy signal from the second channel pair 111*b*.

Figure 8:
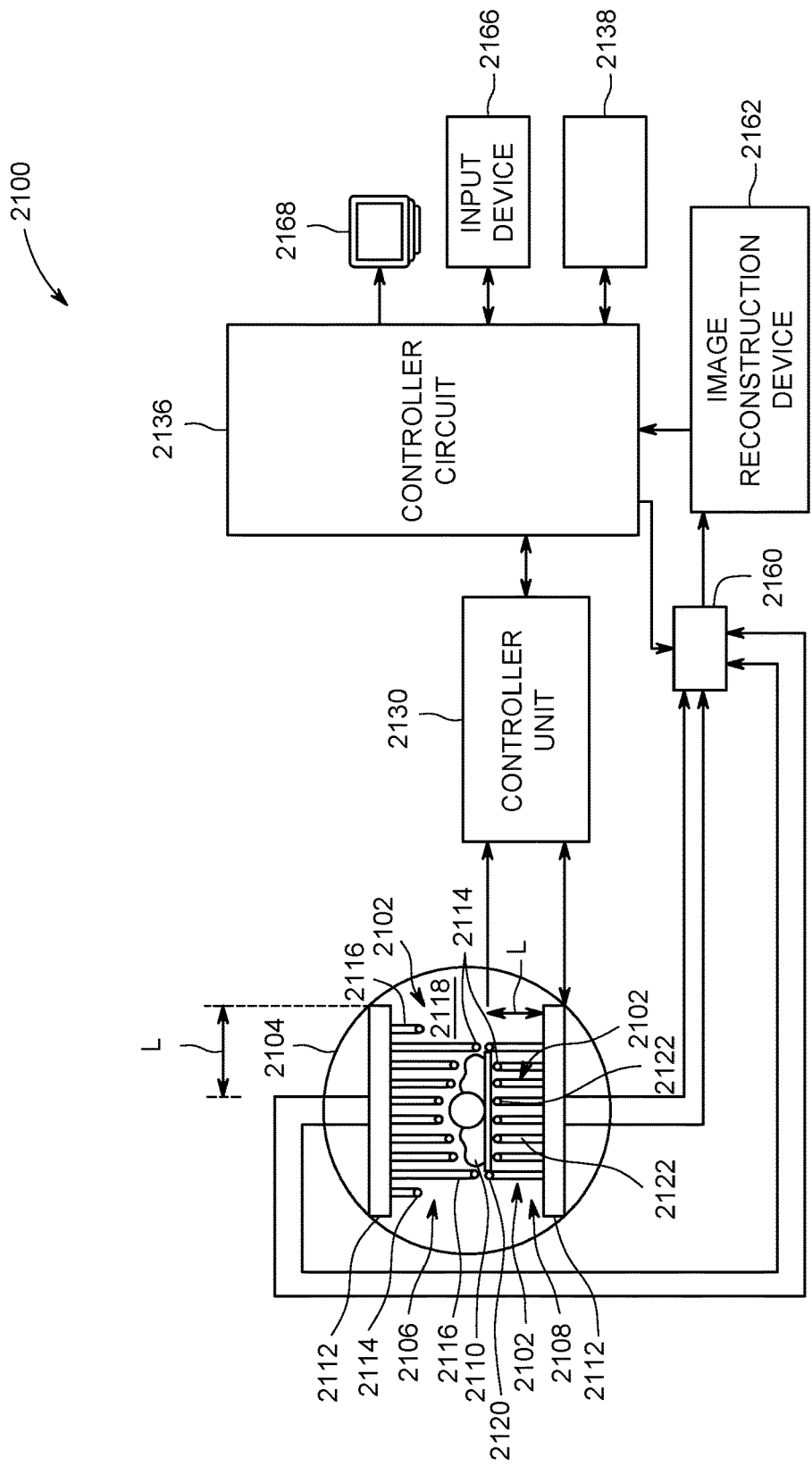
FIG. 8 is a schematic block diagram of an embodiment of a medical imaging system.

The controller circuit 136 may repeat the above process for the remaining triggered pixelated anodes 110 during a scan time of the medical imaging system (e.g., shown in FIG. 8). The scan time can be based on a predetermined amount of time to perform a scan on the patient stored in the memory 138.

Determining a Location of an Event

The controller circuit 136 determines the location of the event based on the non-collected energy signals of adjacent and/or peripheral anodes 114, 118, 120, 122 relative to the collecting anode 116. In connection with FIG. 3, the controller circuit 136 identifies the signal received from the collecting anode 116 as the collected energy signal, which absorbs the event 124. The controller circuit 136 identifies the peripheral anodes 114, 118, 120, 122 that are adjacent to the collecting anode 116 as the non-collected energy signals.

The controller circuit 136 determines the location of the event 124 within the collecting anode 116 based on the non-collected energy signal from the adjacent and/or peripheral anodes 114, 118, 120, 122. The determination of the location along the X and Y coordinates are based on Equations 2 and 3. The variables V1 and V2 represent the output voltage signals 209*b* of the peripheral anodes 114, 118, 120, 122 of the non-collected energy signal. The variable N represents the error in calculating the location of event 124 due to the noise of the non-collected energy signals.

$$X = \frac{[(V1-V2)+\sqrt{2}\,N]}{[(V1+V2)+\sqrt{2}\,N]} \quad \text{Equation (2)}$$

$$Y = \frac{[(V1-V2)+\sqrt{(2}\,N]}{[(V1-V2)+\sqrt{2}\,N]} \quad \text{Equation (3)}$$

The selection of the peripheral anodes 114, 118, 120, 122 is based on the alignment along the X and Y planes relative to the collecting anode 116. For example, Equation 2 is utilized to determine a position of the event along the X coordinate. The peripheral anodes 114, 118 are aligned along the X plane relative to the collecting anode 116. The variable V1 represents the amplitude 210*b* of the output voltage signal 209*b* of the non-collected energy signal of the peripheral anode 114. The variable V2 represents the amplitude 210*b* of the output voltage signal 209*b* of the non-collected energy signal of the peripheral anode 118.

In another example, Equation 3 is utilized to determine a position of the event along the Y coordinate. The peripheral anodes 120, 122 are aligned along the Y plane relative to the collecting anode 116. The variable V1 represents the amplitude 210*b* of the output voltage signal 209*b* of the non-collected energy signal of the peripheral anode 122. The variable V2 represents the amplitude 210*b* of the output voltage signal 209*b* of the non-collected energy signal of the peripheral anode 120.

The electronic noise (e.g., represented as the variable N) can be generated by the electronic channels 111, the RPD 100, and/or the like. The electronic noise represents the noise degradation, which is utilized by the controller circuit 136 to adjust the location of the event 124. The noise degradation is based on the dimensions (e.g., pitch, size) of the pixelated anodes 110 of the RPD 100. For example, the RPD 100 may represent a CZT detector having a 1.64 millimeter pitch. The non-collected energy signals have a peak time of 30 nanoseconds. The upper limit of the electronic noise of the electronic channels 111 is 3.3% of the measured non-collected signals. The RPD 100 has a pixel size of 1.64 millimeters, and the upper limit of the noise contribution from the RPD 100 is 2.8% of the measured non-collected signals. Based on the upper limits of the noise from the electronic channels 111 and the RPD 100, the controller circuit 136 determines an upper limit of the noise as 4.32% of the measured non-collected signals. Based on the upper limit of the noise being 4.32%, the controller circuit 136 determines the error in finding the location of event 124

Determining Gray Values for the Pixelated Anode

Figure 6:
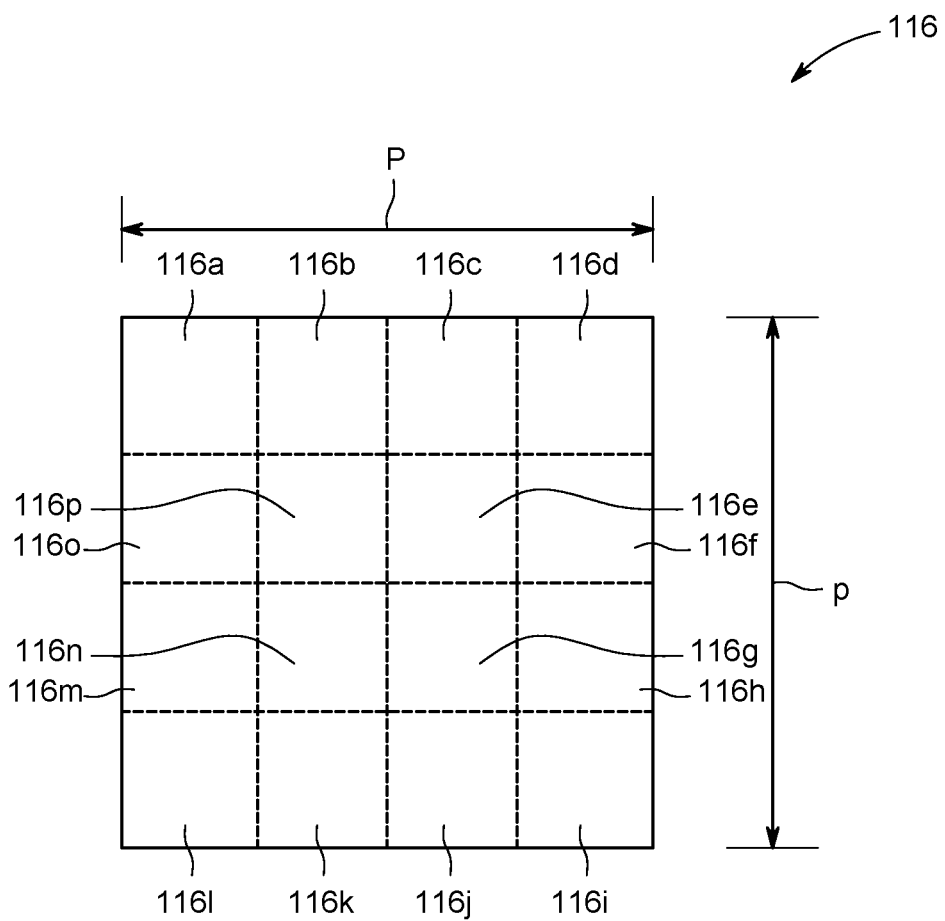
FIG. 6 is a peripheral view of an embodiment of a portion of a radiation pixelated detector.

FIG. 6 is a peripheral view of an embodiment of a portion of the RPD 100. For example, the controller circuit 136 divides the collecting anode 116 into sub-pixels 116*a-p*. Divisions between the sub-pixels 116*a-p* are shown as dashed lines in FIG. 6. Generally, the collecting anode 116 may be divided into multiple virtual sub-pixels 116*a-p* determined by the controller circuit 136. The sub-pixels 116*a-p* include a grid of sub-pixels that extend over the entire surface of the collecting anode 116. It may be noted that the sub-pixels 116*a-p* in the illustrated embodiment are not physically separate from each other, but instead are virtual entities (e.g., defined by the controller circuit 136). The sub-pixels are further described in U.S. Publication No. 2017/0269240, entitled "SYSTEMS AND METHODS FOR IMPROVING IMAGING BY SUB-PIXEL CALIBRATION," which is incorporated by reference in its entirety.

In the illustrated example, the collecting anode 116 includes a 4×4 grid of sub-pixels 116*a-p* for a total of 16 sub-pixels 116*a*, 116*b*, 116*c*, 116*d*, 116*e*, 116*f*, 116*g*, 116*h*, 116*i*, 116*j*, 116*k*, 116*l*, 116*m*, 116*n*, 116*o*, and 116*p*. It may be noted that the depicted embodiment is meant by way of example, and that other shapes and/or numbers of sub-pixels may be employed in other embodiments. For example, the depicted collecting anode 116 includes a 4×4 grid of the sub-pixels 116*a-p*; however, in other embodiments, each pixel may include a 2×2 grid of sub-pixels, or a 3×3 grid of sub-pixels, among others. Each of the sub-pixels 116*a-p* in the illustrated embodiment has associated therewith a number of events and/or energies associated within a particular sub-pixel 116*a-p* (e.g., identified as being absorbed at a location corresponding to the particular sub-pixels 116*a-p*).

The controller circuit 136 is configured to determine a desired gray-level (DG) responsive to the number of events located for the corresponding sub-pixels 116*a-p* is based on the locations of the events relative to the sub-pixels 116*a-p* from the Equations 2-3. The number of events can be represented as a histogram of a number of events measured versus the energy of the events for the sub-pixels 116*a-p*. The energy may represent a measured spectrum of energies for each of the sub-pixels 116*a-p*. The DG value is based on the number of events and/or the measured energy of the spectrum, which can be stored as a lookup table in the memory 138.

For example, the DG values may range from zero (e.g., black) to 256 (e.g., white) shades of gray. The gray level of a pixel or sub-pixel is determined according to the normalized number of events measured in the pixel or sub-pixel that are having energy within a predetermined energy-window corresponding to the energy of the isotope used in the imaging. The normalized number of events in a sub-pixel or pixel is the number of events in the pixel or sub-pixel divided by the maximum number of events measured in one of the pixels or sub-pixels, respectively. Normalized number that is equal to 1 corresponds to gray level 256. For example, the controller circuit 136 determines the sub-pixel 116*a* includes 64 events having a measured energy within the predetermined energy-window. The maximum number of events measured by one of the sub-pixels is identified by the controller circuit 136 to be 512. Accordingly, the normalized number of events in the sub-pixel 116*a* is 64/512=0.125. Accordingly, the controller circuit 136 assigns to sub-pixel 116*a* a desired gray level (DG) that is equal to 0.125× 256=32.

Method for Identifying a Signal and a Location of the Event.

Figure 7:
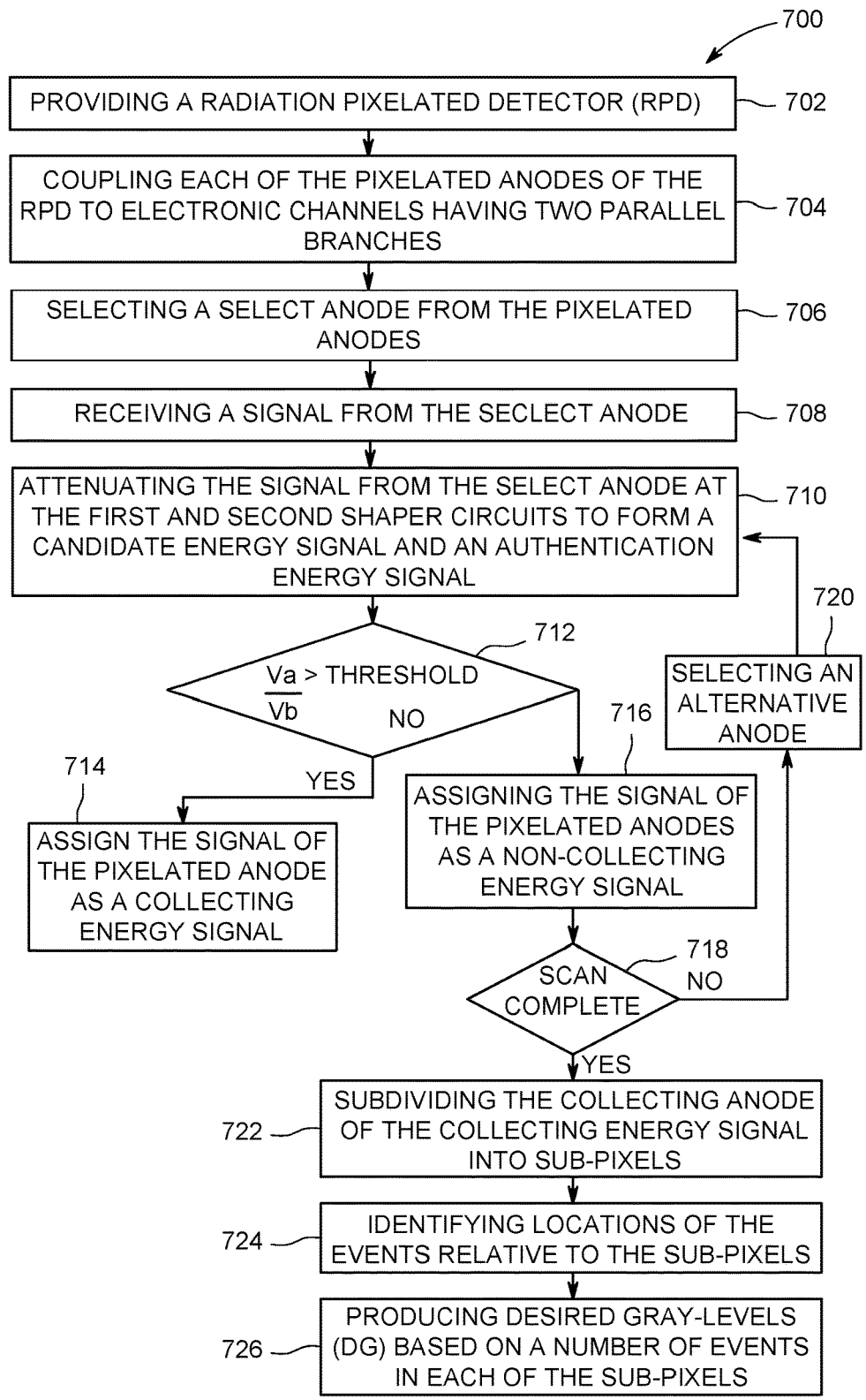
FIG. 7 is a flow chart of a method of an embodiment for identifying a collected energy signal and/or a non-collected energy signal and a location of the event.

FIG. 7 is a flow chart of a method of an embodiment for identifying a collected energy signal and/or a non-collected energy signal and a location of the event. The method 700, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 700 may be used as one or more algorithms to direct hardware to perform one or more operations described herein.

Beginning at 702, providing the RPD 100. In connection to FIG. 2, the RPD 100 includes a plurality of pixelated anodes 110. The plurality of annotated pixels 110 are shown as a grid, matrix, or array of pixelated anodes 110 disposed on a reception surface or first surface 104 of the RPD 100. In some embodiments, the pixelated anodes 110 (and/or associated processing circuitry) generate the collected energy signals responsive to absorb of the photon 141 (e.g., the event 124) within the pixelated anodes 110 itself, and the non-collected energy signals responsive to induced charges on neighboring or adjacent pixelated anodes 110 induced by impact of photons within other adjacent or neighboring pixels where the collected energy signals are generated as discussed herein.

At 704, electrically coupling each of the pixelated anodes 110 of the RPD 100 to the electronic channels 111. The electronic channels 111 includes two parallel channel pairs 111*a-b*. In connection with FIG. 4, the electronic channels 111 are electrically coupled to each of the pixelated anodes 110.

In connection with FIG. 5, the electronic channels 111 include two parallel channel pairs 111*a-b*. The first channel pair 111*a* includes a first shaper circuit 135. The first shaper circuit 135 is configured to attenuate the signal based on the attenuation profiles. For example, the first shaper circuit 135 attenuates the signal received from the pixelated anodes 110 to have a peak at 250 nanoseconds. Additionally or alternatively, the first shaper circuit 135 is configured to amplify the signal of the collected energy signal based on a time constant, which improves the signal-to-noise ratio of the collected energy signal.

The second channel pair 111*b* includes the second shaper circuit 142. The second shaper circuit 142 is configured to attenuate the signal based on attenuation profiles. For example, the second shaper circuit 142 attenuates the signal received from the pixelated anodes 110 to have a peak between 30-60 nanoseconds. Additionally or alternatively, the second shaper circuit 142 is configured to amplify the signal of the non-collected energy signal based on a time constant to improve the signal-to-noise ratio. The output voltage signals 206*a-b*, 209*a-b* of the first and second channel pairs 111*a-b* are represented as Va and Vb, respectively. The output voltage signals 206*a-b*, 209*a-b* may represent the amplitudes 207*a-b*, 210*a-b*.

At 706, the at least one processor selects a select anode (e.g., select pixel) from the pixelated anodes 110. For example, the at least one processor selects the select anode that receives a data packet 146 and/or signal from the electronic channels 111. The selected pixel may be the pixel that generates a signal (e.g., the collected energy signal, the non-collected energy signal), which is strong enough to pass a threshold level set by the comparator circuit 137 to be transferred to the amplifier circuit 139 on the way to the voltage outputs 206*a-b*, 209*a-b* of the first and second channel pairs 111*a*-*b*, respectively (shown in FIG. 5) and to generate a trigger for the controller circuit 136 (shown in FIG. 4).

At 708, the at least one processor receives a signal from the select anode. For example, the signal represents the data packet 146 from the electronic channels 111.

At 710, the electronic channels 111 attenuate the signal from the select anode at the first and second shaper circuits 135,142 to form a candidate energy signal and an authentication energy signal. For example, the candidate energy signal represents the output of the first channel pair 111*a*. The candidate energy signal is attenuated by the first shaper circuit 135, amplified by the amplifier circuit 139, and represents the output of the P&H circuit 200.

The authentication energy signal represents the output of the second channel pair 111*b*. The authentication energy signal is attenuated by the second shaper circuit 142, amplified by the amplifier circuit 139, and represents the output of the P&H circuit 200.

At 712, the at least one processor determines whether the signal from the select anode (e.g., one of the pixelated anodes 110) is the collected energy signal or the non-collected energy signal. For example, the at least one processor forms a ratio from the candidate energy signal (e.g., the output voltage signals 206*a*-*b*), and the authentication energy signal (e.g., the output voltage signals 209*a*-*b*) from the first and second channel pairs 111*a*-*b*. The at least one processor forms the ratio as the candidate energy signal of the first channel pair 111*a* over the authentication energy signal of the second channel pair 111*b*. The at least one processor compares the ratio to a threshold. For example, the threshold may be 0.5. In various embodiments the threshold may be greater than and/or smaller than 0.5.

Responsive to the at least one processor determining the ratio is greater than the threshold, at 714, the at least one processor assigns the signal of the select anode as the collected energy signal. For example, the at least one processor compares the ratio to the threshold of 0.5 to identify whether the signal from the select anode is the collected energy signal or the non-collected energy signal. The at least one processor determines the ratio is 4.24, which is above the threshold. Responsive to the at least one processor determining the ratio is above the threshold, the at least one processor determines the select anode is a collecting pixel (e.g., the collecting pixel 116) and absorbs the photon 141 and/or includes the event 124 (FIG. 3). The at least one processor selects the candidate energy signal (e.g., output voltage signal 206*a*) of the first channel pair 111*a* as the collected energy signal.

Responsive to the at least one processor determining the ratio is less than the threshold, at 716, the at least one processor assigns the signal of the select anode as the non-collected energy signal. For example, the at least one processor forms a ratio from a peripheral candidate energy signal (e.g., the output voltage signals 206*a*-*b*), and a peripheral authentication energy signal (e.g., the output voltage signals 209*a*-*b*) from the first and second channel pairs 111*a*-*b*. The at least one processor compares the ratio to the threshold of 0.5 to identify whether the signal from the select anode is the collected energy signal or the non-collected energy signal. The at least one processor determines the ratio is 0.1, which is below the threshold. Responsive to the at least one processor determining the ratio is below the threshold, the at least one processor determines the pixelated anodes 110 is the non-collected energy signal. For example, the at least one processor determines that the select anode is adjacent to the collecting anode (e.g., the collecting anode 116) that absorbs the photon 141 and/or includes the event 124 (FIG. 3). The at least one processor selects the authentication energy signal (e.g., the voltage output 209*b*) of the second channel pair 111*b* as the non-collected energy signal.

At 718, the at least one processor determines whether the scan is complete. For example, the scan can be for a predetermined amount of time stored in the memory 138. Responsive to the at least one processor determining that the amount of time has passed, the at least one processor determines that the scan is complete. Additionally or alternatively, the scan may be completed when a certain amount of peripheral anodes 110, such as the peripheral anodes 114, 118, 120, 122 of the RPD 100 that generate authentication signals, are detected in direct adjacency to the collecting anode 110, such as the collecting anode 116, which generate a collected energy signal.

If the scan is not complete, then at 720, the at least one processor selects an alternative pixelated anodes 110 from the RPD 100. For example, the at least one processor selects an alternative pixelated anodes 110 that receives the data packet 146 and/or signal from the electronic channels 111. The signal representing the voltage output from the electronic channels 111. Responsive to the selection of alternative pixelated anodes 110 of the RPD 100, the at least one processor receives signals from the plurality of pixelated anodes 110. For example, the at least one processor repeats the attenuating operation at 710 and the operation at 712 (e.g., comparing operation) to identify one or more collecting anodes that has the collected energy signal and a plurality of peripheral anodes (e.g., adjacent to the collecting anode) that has the non-collected energy signal.

At 722, the at least one processor subdivides the collecting anode 116 of the collected energy signal into sub-pixels. For example, the collecting anode 116 represents the select anode having the collected energy signal. In connection with FIG. 6, the at least one processor determines the collecting anode 116 receives the event 124, representing the collected energy signal. The at least one processor defines sub-pixels 116*a*-*p* for the collecting anode 116. For example, the sub-pixels 116*a*-*p* are virtual sub-pixels 116*a*-*p* defined by the at least one processor, and are not physically separated or distinct in the depicted embodiment. It may be noted that in some embodiments, the sub-pixels 116*a*-*p* may be uniform in size and symmetrically distributed. It may be noted that in other embodiments the sub-pixels 116*a*-*p* may not be uniform in size and/or may be non-symmetrically distributed along the collecting anode 116.

At 724, the at least one processor identifies locations of the events relative to the sub-pixels 116*a*-*p*. For example, the at least one processor identifies the peripheral anodes 114, 118, 120, 122 of the RPD 100 that are adjacent to the collecting anode 116. In connection with FIG. 3, the at least one processor identifies the peripheral anodes 114, 118, 120, 122 that are adjacent to the collecting anode 116 and provide the non-collected energy signals (e.g., the authentication energy signal). The at least one processor determines the location of the event 124 relative to the sub-pixels 116*a*-*p* based on the Equations 2-3.

The at least one processor determines the location of the event 124 along the X coordinates based on the peripheral anodes 114, 118 aligned along the X plane based on the X, Y Cartesian coordinate system 126. For example, the at least one processor determines the location of the event 124 along the X plane based on the Equation 2 and the voltage outputs of the peripheral anodes 114, 118 from the second channel pair 111*b*.

The at least one processor determines the location of the event 124 along the Y coordinates based on the peripheral anodes 120, 122 aligned along the Y plane based on the X, Y Cartesian coordinate system 126. For example, the at least one processor determines the location of the event 124 along the Y plane based on the Equation 3 and the voltage outputs of the peripheral anodes 120, 122 from the second channel pair 111*b*.

At 726, the at least one processor produces desired gray levels (DG) based on a number of events in each of the sub-pixels 116*a-p*. For example, the at least one processor determines during the scan the sub-pixels 116*a-p* that receives at least one event (e.g., the event 124). It may be noted in an embodiment more than one pixelated anode 110 may include at least one event, such as multiple collecting anodes. The at least one processor determines a number of events in each of the sub-pixels 116*a-p* based on the locations of the events relative to the sub-pixels 116*a-p* determined at 714. The number of events and the measured energy are utilized by the at least one processor to assign the DG value for the sub-pixels 116*a-p*. For example, the at least one processor compares the number of events and/or the measured energy to a look up table stored in the memory to determine the DG value.

Medical Imaging System

FIG. 8 is a schematic block diagram of an embodiment of a medical imaging system 2100, in accordance with an embodiment. For example, the medical imaging system 2100 is shown as a nuclear medicine (NM) imaging system. Optionally, the medical imaging system 2100 may be a PET, SPECT, MBI, and/or the like.

The medical imaging system 2100 includes a plurality of imaging detectors 2102 mounted to a gantry 2104. The imaging detectors 2102 are configured as two separate detector arrays 2106 and 2108 coupled to the gantry 2104 above and below a subject 2110 (e.g., a patient). The detector arrays 2106 and 2108 may be coupled directly to the gantry 2104, or may be coupled via support members 2112 to the gantry 2104 to allow movement of the entire arrays 2106 and/or 2108 relative to the gantry 2104 (e.g., translating movement in the left or right direction as viewed in FIG. 21). Additionally, each of the imaging detectors 2102 includes a detector unit 2114 mounted to a movable detector carrier 2116 (e.g., a support arm or actuator that may be driven by a motor to cause movement thereof) that extends from the gantry 2104. In some embodiments, the detector carriers 2116 allow movement of the detector units 2114 towards and away from the subject 2110, such as linearly and in parallel to each other. The imaging detectors 2102 may include one or more detector units 2114 coupled to a respective detector carrier 2116 and having dimensions of 4 cm to 20 cm and may be formed of tiles and/or modules of Cadmium Zinc Telluride (CZT), CdMnTe (CMT), HgI, Si, GaAr, Si, Ge and/or the like.

The gantry 2104 may be formed with an aperture 2118 (e.g., opening or bore) therethrough as illustrated. A patient table 2120 is configured with a support mechanism (not shown) to support and carry the subject 2110 in one or more of a plurality of viewing positions within the aperture 2118 and relative to the imaging detectors 2102. The gantry 2104 may also be configured in other shapes (e.g., "C", "H" and "L"), and may be rotatable about the subject 2110.

Each of the imaging detectors 2102 have a radiation pixelated detector, which is directed towards the subject 2110 or a region of interest within the subject. The radiation pixelated detector may include one or more collimators 2122. The field of view for each of the imaging detectors 2102 may be increased, decreased, or relatively unchanged by the type of collimator 2122. In one embodiment, the collimator 2122 is a multi-bore collimator, such as a parallel hole collimator. However, other types of collimators, such as converging or diverging collimators may optionally or alternatively be used. Other examples for the collimator 2122 include pinhole, parallel-beam converging, diverging fan-beam, converging or diverging cone-beam, multi-bore converging, multi-bore converging fan-beam, multi-bore converging cone-beam, multi-bore diverging, or other types of collimator. In some embodiments, at least two types of collimators are used. Optionally, multi-bore collimators may be constructed to be registered with pixels of the detector units 2114.

The medical imaging system 2100 includes a controller unit 2130. The controller unit 2130 is configured to control a movement and positioning of the patient table 2120, the imaging detectors 2102, the gantry 2104, the collimators 2122, and/or the like. A range of motion before or during an acquisition, or between different image acquisitions, is set to maintain the actual field of view (FOV) of each of the imaging detectors 2102. The controller unit 2130 may include a gantry motor controller, a table controller, a detector controller, a pivot controller, a collimator controller, and/or the like. For example, the controllers may be automatically commanded by a controller circuit 2136, manually controlled by an operator, or a combination thereof.

The imaging detectors 2102 may be positioned to image a portion of the subject 2110 based on events detected the controller circuit 2136. Positioning may be accomplished manually by the operator and/or automatically. After the imaging detectors 2102, gantry 2104, patient table 2120, and/or collimators 2122 are positioned by the controller unit 2130, one or more images are acquired by one or more of the imaging detectors 2102 being used. The image data acquired by the imaging detectors 2102 may be combined and reconstructed into a composite image, which may comprise two-dimensional (2D) images, a three-dimensional (3D) volume or a 3D volume over time (4D).

In various embodiments, a readout unit 2160 receives electrical signal data produced by the imaging detectors 2102 and converts this data into digital signals for subsequent processing. The readout unit 2160 may be similar to and/or the same as the readout unit 132 in FIG. 4. Additionally or alternatively, digital signals are generated by the imaging detectors 2102. An image reconstruction device 2162 and a memory 2164 may be provided in addition to the controller circuit 2136. The controller circuit 2136 is configured to control the operation of the medical imaging system 2100. The controller circuit 2136 may be similar to and/or the same as the controller circuit 136 in FIG. 5. The controller circuit 2136 may include at least one processor. Optionally, the controller circuit 2136 may include a central processing unit (CPU), one or more microprocessors, or any other electronic component capable of processing input data according to specific logical instructions. Optionally, the controller circuit 2136 may include and/or represent one or more hardware circuits or circuitry that include, are connected with, or that both include and are connected with one or more processors, controllers, and/or other hardware logic-based devices. Additionally or alternatively, the controller circuit 2136 may execute instructions stored on a tangible and non-transitory computer readable medium (e.g., the memory 2164). Additionally or alternatively, the readout unit 2160 and the image reconstruction device 2162 may be integrated with and/or a part of the controller circuit 2136. Additionally, a user input device 2166 may be provided to receive user inputs (e.g., control commands), as well as a display 2168 for displaying images.

In an embodiment, a method (e.g., for identifying a collected energy signal and/or a non-collected energy signal and a location of the event) is provided. The method includes receiving signals from pixelated anodes of a radiation pixelated detector during at least one event, passing the signals from the pixelated anodes through corresponding channel pairs, each of the channel pairs including first and second shaper circuits, and attenuating the signal from a select anode at the first and second shaper circuits coupled to the select anode to form a candidate energy signal and an authentication energy signal, respectively. The method further includes comparing a ratio of the candidate and authentication energy signals to identify whether the candidate energy signal from the select anode is a collected energy signal or a non-collected energy signal. The method includes repeating the attenuating and comparing operations for a plurality of select anodes to have one or more collecting anode and a plurality of peripheral anodes. The method includes subdividing the select anode, having the collected energy signal, into a plurality of sub-pixels, and identifying a location of the at least one event relative to the plurality of sub-pixels based on a plurality of the non-collected energy signals from the plurality of peripheral anodes.

Optionally, the comparing operation identifies the candidate energy signal as a collected energy signal wherein the collected energy signal is collected from at least one pixelated anode that includes the at least one event. Additionally or alternatively, the pixelated anodes include a peripheral anode adjacent to the select anode that includes the at least one event. Optionally, the method includes attenuating the signal from the peripheral anode at first and second shaper circuits coupled to the peripheral anode to form peripheral candidate and authentication energy signal, and comparing the peripheral candidate and authentication energy signals to identify a non-collected energy signal.

Optionally, the comparing operation comprises comparing the ratio to a threshold.

Optionally, the attenuating the signal from the peripheral anode and the comparing operations are performed for a plurality of peripheral anodes surrounding the select anode.

Optionally, the attenuating the signal from the select anode comprise passing the signal through first and second shaper circuits having different first and second attenuation profiles to form the candidate energy signal and corresponding to the first and second shaper circuits.

Optionally, the method includes calculating a noise for the non-collected energy signals for pixelated anodes adjacent to the select anode having the collected energy signal, and determining a location of the at least one event with respect to the plurality of sub-pixels based on the noise and the output voltages of the signals of the non-collected energy signals that are adjacent to the select anode.

Optionally, the identifying operation includes producing gray levels based on a number of the at least one events or energy measured within the plurality of sub-pixels.

In an embodiment, a system (e.g., a medical imaging system) is provided. The system includes a radiation pixelated detector having a plurality of pixelated anodes operably coupled to corresponding electronic channels. The system includes the electronic channels electrically coupled to the plurality of pixelated anodes having channel pairs. A first channel pair includes a first shaper circuit and a second channel pair includes a second shaper circuit. The system includes at least one processor operably coupled to the electronic channels. The at least one processor is configured to receive signals from pixelated anodes of a radiation pixelated detector during at least one event, and pass the signals from the pixelated anodes through corresponding channel pairs. Each of the channel pairs includes first and second shaper circuits. The at least one processor is configured to attenuate the signal from a select anode at the first and second shaper circuits coupled to the select anode to form a candidate energy signal and an authentication energy signal, respectively. The at least one processor is further configured to compare a ratio of the candidate and authentication energy signals to identify whether the candidate energy signal from the select anode is a collected energy signal or a non-collected energy signal. The at least one processor is further configured to repeat the attenuating and comparing operations for a plurality of select anodes having one or more collecting anode and a plurality of peripheral anodes. The at least one processor is further configured to subdivide the collecting anode having the collected energy signal into a plurality sub-pixels. The at least one processor is further configured to identify a location of the at least one event relative to the plurality of sub-pixels based on a plurality of the non-collected energy signals from the plurality of peripheral anodes.

Optionally, the at least one processor identifies the candidate energy signal as a collected energy signal, the collected energy signal being collected from the select anode that includes the at least one event. Additionally or alternatively, the pixelated anodes include a peripheral anode adjacent to the select anode that includes the at least one event. Optionally, the at least one processor further is configured to attenuate the signal from the peripheral anode at first and second shaper circuits coupled to the peripheral anode to form peripheral candidate and authentication energy signal, and compare the peripheral candidate and authentication energy signals to identify a non-collected energy signal.

Optionally, the at least one processor is configured to compare the ratio to a threshold. Additionally or alternatively, the threshold is 0.5.

Optionally, the first and second shaper circuits have different first and second attenuation profiles to form the candidate energy signal and corresponding to the first and second shaper circuits.

Optionally, the at least one processor is configured to calculate a noise for the non-collected energy signals for pixelated anodes adjacent to the select anode, and determine a location of the at least one event with respect to the sub-pixels based on the noise and the output voltages of the signals of the non-collected energy signals that are adjacent to the select anode. Additionally or alternatively, the at least one processor is configured to produce gray levels based on a number of events or energy measured within the sub-pixels.

In an embodiment a tangible and non-transitory computer readable medium comprising one or more programmed instructions configured to direct one or more processors is provided. The one or more processors are directed to receive signals from pixelated anodes of a radiation pixelated detector during at least one event, and pass the signals from the pixelated anodes through corresponding channel pairs. Each of the channel pairs including first and second shaper circuits. The one or more processors are further directed to attenuate the signal from a select anode at the first and second shaper circuits coupled to the select anode to form a candidate energy signal and an authentication energy signal, respectively. The one or more processors are further directed to compare a ratio of the candidate and authentication energy signals to identify whether the candidate energy signal from the select anode is a collected energy signal or a non-collected energy signal, and subdivide the select anode having the collected energy signal into a plurality of sub-pixels. The one or more processors are further directed to repeat the attenuating and comparing operations for a plurality of anodes having one or more collecting anode and a plurality of peripheral anodes. The one or more processors are further directed to subdivide the collecting anode having the collected energy signal into a plurality of sub-pixels, and identify a location of the at least one event relative to the plurality of sub-pixels based on non-collected energy signals from the plurality of peripheral anodes.

Optionally, the one or more processors are directed to identify the candidate energy signal as a collected energy signal and the pixelated anodes include a peripheral anode adjacent to the select anode, attenuate the signal from the peripheral anode at first and second shaper circuits coupled to the peripheral anode to form peripheral candidate and authentication energy signal, and compare the peripheral candidate and authentication energy signals to identify a non-collected energy signal.

Optionally, the one or more processors are directed to compare the ratio to a threshold of 0.5.

Optionally, the one or more processors are directed to produce gray levels based on a number of events or energy measured within the sub-pixels.

It may be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "subsystem," "controller circuit," "circuit," or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "controller circuit".

The computer, subsystem, controller circuit, circuit, or module execute a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, subsystem, controller circuit, and/or circuit to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a controller circuit, circuit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A method comprising:
   receiving signals from pixelated anodes of a radiation pixelated detector during at least one event;
   passing the signals from the pixelated anodes through corresponding channel pairs, each of the channel pairs including first and second shaper circuits;
   attenuating the signal from a select anode at the first and second shaper circuits coupled to the select anode to form a candidate energy signals and an authentication energy signals, respectively;
   comparing a ratio of the candidate and authentication energy signals to identify whether the candidate energy signal from the select anode is a collected energy signal or a non-collected energy signal;
   repeating the attenuating and comparing operations for a plurality of select anodes that comprise one or more collecting anode and a plurality of peripheral anodes;
   subdividing the collecting anode having the collected energy signal into a plurality of sub-pixels; and
   identifying a location of the at least one event relative to the plurality of sub-pixels based on non-collected energy signals from the plurality of peripheral anodes.

2. The method of claim 1, wherein the comparing operation identifies the candidate energy signal as a collected energy signal wherein the collected energy signal is collected from at least one pixelated anode that includes the at least one event.

3. The method of claim 2, wherein the pixelated anodes include a peripheral anode adjacent to the select anode that includes the at least one event, the method further comprising:
   attenuating the signal from the peripheral anode at first and second shaper circuits coupled to the peripheral anode to form peripheral candidate and authentication energy signal; and
   comparing the peripheral candidate and authentication energy signals to identify a non-collected energy signal.

4. The method of claim 1, wherein the comparing operation comprises comparing the ratio to a threshold.

5. The method of claim 1, wherein the attenuating the signal from the peripheral anode and the comparing operations are performed for a plurality of peripheral anodes surrounding the select anode.

6. The method of claim 1, wherein the attenuating the signal from the select anode comprise passing the signal through first and second shaper circuits having different first and second attenuation profiles to form the candidate energy signal and corresponding to the first and second shaper circuits.

7. The method of claim 1, further comprising calculating a noise for the non-collected energy signals for pixelated anodes adjacent to the select anode having the collected energy signal; and
   determining a location of the at least one event with respect to the plurality of sub-pixels based on the noise and the output voltages of the signals of the non-collected energy signals that are adjacent to the select anode.

8. The method of claim 1, wherein the identifying operation includes producing gray levels based on a number of the at least one events or energy measured within the plurality of sub-pixels.

9. A system comprising:
   a radiation pixelated detector having a plurality of pixelated anodes operably coupled to corresponding electronic channels;
   the electronic channels electrically coupled to the plurality of pixelated anodes having channel pairs, wherein a first channel pair includes a first shaper circuit and a second channel pair includes a second shaper circuit;
   at least one processor operably coupled to the electronic channels, the at least one processor is configured to:
      receive signals from pixelated anodes of a radiation pixelated detector during at least one event;
      pass the signals from the pixelated anodes through corresponding channel pairs, each of the channel pairs including first and second shaper circuits;
      attenuate the signal from a select anode at the first and second shaper circuits coupled to the select anode to form a candidate energy signal and an authentication energy signal, respectively;
      compare a ratio of the candidate and authentication energy signals to identify whether the candidate energy signal from the select anode is a collected energy signal or a non-collected energy signal;
      repeat the attenuate and compare operations for a plurality of select anodes that comprise one or more collecting anode and a plurality of peripheral anodes;
      subdivide the collecting anode having the collected energy signal into a plurality sub-pixels; and
      identify a location of the at least one event relative to the plurality of sub-pixels based on non-collected energy signals from the plurality of peripheral anodes.

10. The system of claim 9, wherein the at least one processor identifies the candidate energy signal as a collected energy signal, the collected energy signal being collected from the select anode that includes the at least one event.

11. The system of claim 10, wherein the pixelated anodes include a peripheral anode adjacent to the select anode that includes the at least one event, the at least one processor further configured to:
   attenuate the signal from the peripheral anode at first and second shaper circuits coupled to the peripheral anode to form peripheral candidate and authentication energy signal; and
   compare the peripheral candidate and authentication energy signals to identify a non-collected energy signal.

12. The system of claim 9, wherein the at least one processor is configured to compare the ratio to a threshold.

13. The system of claim 12, wherein the threshold is 0.5.

14. The system of claim 9, wherein the first and second shaper circuits have different first and second attenuation profiles to form the candidate energy signal and corresponding to the first and second shaper circuits.

15. The system of claim 9, wherein the at least one processor is configured to calculate a noise for the non-collected energy signals for pixelated anodes adjacent to the select anode, and determine a location of the at least one event with respect to the sub-pixels based on the noise and the output voltages of the signals of the non-collected energy signals that are adjacent to the select anode.

16. The system of claim 15, wherein the at least one processor is configured to produce gray levels based on a number of events or energy measured within the sub-pixels.

17. A tangible and non-transitory computer readable medium comprising one or more programmed instructions configured to direct one or more processors to:
  receive signals from pixelated anodes of a radiation pixelated detector during at least one event;
  pass the signals from the pixelated anodes through corresponding channel pairs, each of the channel pairs including first and second shaper circuits;
  attenuate the signal from a select anode at the first and second shaper circuits coupled to the select anode to form a candidate energy signal and an authentication energy signal, respectively;
  compare a ratio of the candidate and authentication energy signals to identify whether the candidate energy signal from the select anode is a collected energy signal or a non-collected energy signal;
  repeat the attenuating and comparing operations for a plurality of anodes that comprise one or more collecting anode and a plurality of peripheral anodes;
  subdivide the collecting anode having the collected energy signal into a plurality of sub-pixels; and
  identify a location of the at least one event relative to the plurality of sub-pixels based on non-collected energy signals from the plurality of peripheral anodes.

18. The tangible and non-transitory computer readable medium of claim 17, wherein the one or more processors are directed to:
  identify the candidate energy signal as a collected energy signal and the pixelated anodes include a peripheral anode adjacent to the select anode;
  attenuate the signal from the peripheral anode at first and second shaper circuits coupled to the peripheral anode to form peripheral candidate and authentication energy signal; and
  compare the peripheral candidate and authentication energy signals to identify a non-collected energy signal.

19. The tangible and non-transitory computer readable medium of claim 17, wherein the one or more processors are directed to compare the ratio to a threshold of 0.5.

20. The tangible and non-transitory computer readable medium of claim 17, wherein the one or more processors are directed to produce gray levels based on a number of events or energy measured within the sub-pixels.

* * * * *